Dec. 25, 1928.
F. E. BURDICK
1,696,343
METHOD OF MAKING EDIBLE ROLLS
Filed July 3, 1925    4 Sheets-Sheet 1
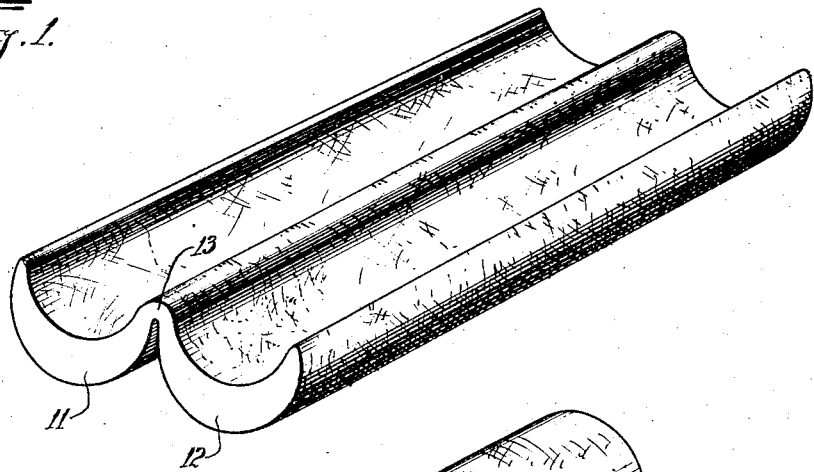
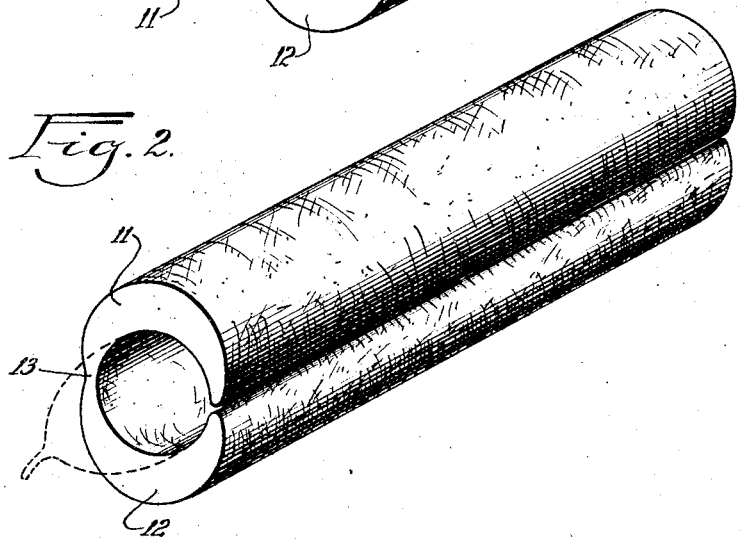
Inventor
Frederick E. Burdick
by S.C. Shonts Dec. 25, 1928.

F. E. BURDICK 1,696,343

METHOD OF MAKING EDIBLE ROLLS

Filed July 3, 1925     4 Sheets-Sheet 2

Inventor:
Frederick E. Burdick
by S.C. Thouts   Atty.

Dec. 25, 1928.

F. E. BURDICK 1,696,343

METHOD OF MAKING EDIBLE ROLLS

Filed July 5, 1925    4 Sheets-Sheet 3

Inventor:
Frederick E. Burdick
By S. C. Shonts
Atty.

Dec. 25, 1928.  1,696,343
F. E. BURDICK
METHOD OF MAKING EDIBLE ROLLS
Filed July 3, 1925    4 Sheets-Sheet 4
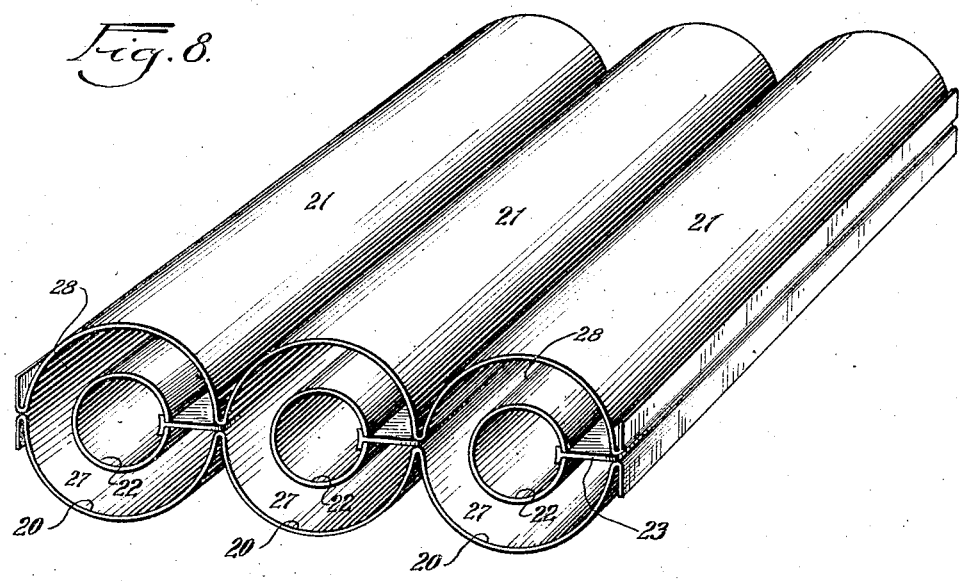
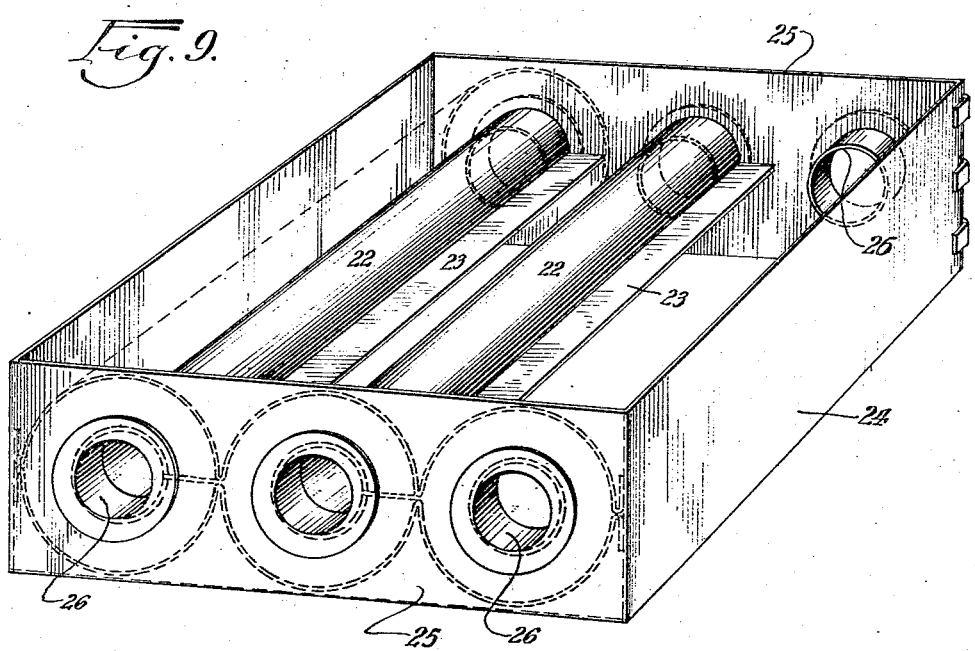
Inventor:
Frederick E. Burdick Patented Dec. 25, 1928.

1,696,343

UNITED STATES PATENT OFFICE.

FREDERICK E. BURDICK, OF NEW LONDON, CONNECTICUT.

METHOD OF MAKING EDIBLE ROLLS.

Application filed July 3, 1925. Serial No. 41,272.

The invention relates to method of making edible rolls.

It relates particularly to a method for making a roll for receiving frankfurters to make sandwiches popularly known as "hot dogs."

The usual practice in serving "hot dogs" is to cut an oblong roll in two along its longitudinal axis, insert a frankfurter between the halves and serve to the customer. The frankfurter is so large relative to the roll that the two halves do not come together nicely and the sandwich is rather difficult to handle. While it is being eaten it tends to separate and unless the consumer is careful he will lose part of it.

The present invention has been devised to overcome these objections by providing a roll which will easily receive a frankfurter and combine with it to make a neat, compact frankfurter sandwich which is easy to handle.

The object of the invention is to provide an improved method of making a roll to receive frankfurters.

Other objects and advantages will hereinafter appear.

An embodiment of the invention is shown in the drawings in which

Figure 1 is a perspective view of the roll in condition to receive a frankfurter.

Figure 2 is a perspective view of the roll after a frankfurter has been placed in it and its halves have been closed to form the frankfurter sandwich.

Figure 8 is a perspective view of the top, bottom and core used in the apparatus for making the modified form of roll.

Figure 9 is a perspective view of the assembled baking pan or apparatus for making the modified form of roll.

The roll will be described by first describing the method and apparatus for making it.

Figure 3:
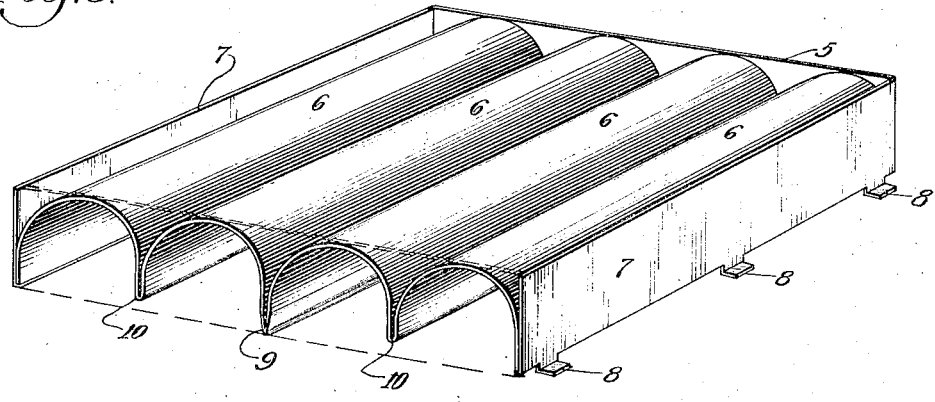
Figure 3 is a perspective view of the upper half or cover of the baking pan used for making the roll.
Figure 4:
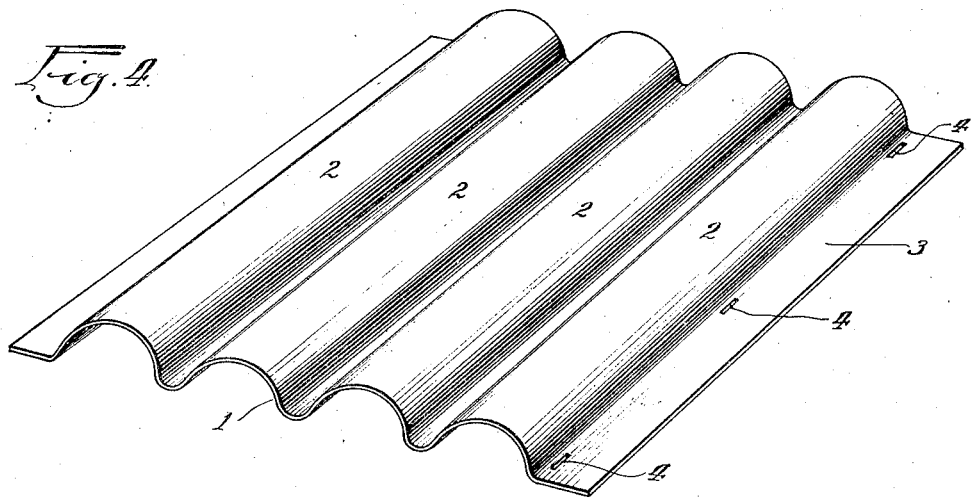
Figure 4 is a perspective view of the bottom half of the baking pan.
Figure 5:
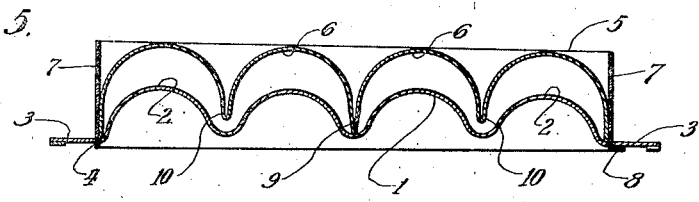
Figure 5 is an end view of the pan removed showing the relation of top and bottom when the pan is assembled.

A baking pan is used, as illustrated in Figures 3 and 4, which has a lower or bottom portion or pan 1 preferably of rectangular shape. The bottom of this lower portion is provided with a series of ribs, ridges, or corrugations 2 which are illustrated as semicircular. The juncture between the lower edges of the ribs is slightly rounded so as to provide a smooth merging of one ridge into the other. The ends of the pan have flat portions 3 provided with slots 4 for the reception of lugs on the top or cover.

The cover 5 is also rectangular in shape and it has depressions or valleys 6 which are complementary to the ridges on the bottom or lower portion. It is surrounded by a metal frame the ends 7 of which extend below the lowest part of the cover and carry lugs 8 shaped to fit into the slots 4 in the bottom of the pan. When the cover is placed over the bottom portion of the pan, the ends 7 serve to hold the top of the cover in spaced relation to the ridges on the bottom.

It will be noted that every other juncture between the valleys in the cover has a sharp edge as at 9 and the other alternate junctures 10 are rounded. The purpose of the different shape of the alternate junctures will later appear.

The rolls are made by spreading a thin layer of dough over the ridges on the bottom part of the pan. This layer should be as uniform as possible and just thick enough to give a convenient thickness to the walls of the baked roll.

The cover is then placed over the bottom, the lugs 8 being forced into the slots 4, and the cover pressed down until its edges 7 rest on the flat surfaces 3 of the bottom pan. The two parts may be clamped together if desired by any convenient form of clamping or holding means.

When the cover is pressed onto the bottom, it spreads the dough out uniformly and separates it at the bottom of every other ridge. This separation is accomplished by the sharp edges 9 which contact the metal at the juncture between every other ridge and cut the dough along the line of contact. The rounded edges 10 remain spaced from the bottom but they are preferably a little closer to the bottom than the main portion of the cover so as to provide a weakened portion in the dough along the line of the location of the rounded edges.

A thin layer of dough is thus held in semi-circular ridges or in semi-tubular form between the top and bottom of a baking pan.

The pan is then placed in an oven and the dough baked to proper degree after which the pan is removed, the top taken off and the rolls taken out. They come out in the form shown in Figure 1, that is, the adjacent semi-circular or semi-tubular sections are joined together by a weakened portion which permits one section to be folded over on the other.

It will be appreciated that the size and shape of the pan may be varied to meet the requirements. The rolls are formed by a series of steps, the first of which is to form the dough into a series of semi-tubular corrugations or ridges. Every other section is then separated from the next adjacent section and lines of weakness are formed between the sections that are not separated. The dough is then held in this position and baked. This produces a roll or rolls comprising two semi-tubular sections joined together by a weakened portion. One section is folded over on the other to make a complete sandwich with a frankfurter between them.

The completed roll is illustrated in Figure 1 as it comes from the pan. It is baked a tasty brown on all its exposed surfaces. A hot frankfurter may be laid in either half and the other folded over to make a neat, compact "hot dog". This may be done without distorting the walls of the roll because they fit around the frankfurter.

The rolls need not necessarily be semi-circular although this is the most convenient form. They may be oval or square or any other suitable tubular shape. The two sections can also be baked separately if desired but it is more convenient and desirable to have the two sections joined together.

The roll and the sandwich formed with it has many advantages over the ones now in use. In the first place it requires less material because there is no center to it. The center of the ordinary roll requires material for making it but when the roll is cut in half, a frankfurter placed between, and the two parts squeezed onto the frankfurter, the soft center is compacted into an unpalatable doughy mass. If this practice is not followed, the alternative is to cut the center out and throw it away and the material is wasted. The roll is, therefore, more economical in material.

It also eliminates the necessity for cutting. It is ready to use as it comes from the pan by simply inserting the hot frankfurter and folding one-half over the other. It is, therefore, more economical and convenient to handle.

It also makes a neater sandwich not only for packing but also for eating. It will not fall apart like the ordinary frankfurter sandwich when it is laid down on a table or counter, or packed in a container. It is a convenient size for eating and when a bite is taken off of one end the remaining parts do not fall apart and tend to separate. The manner in which the component parts fit together insures that they will remain together while the sandwich is being handled.

The roll is also more palatable as it is browned on all sides.

Figure 6:
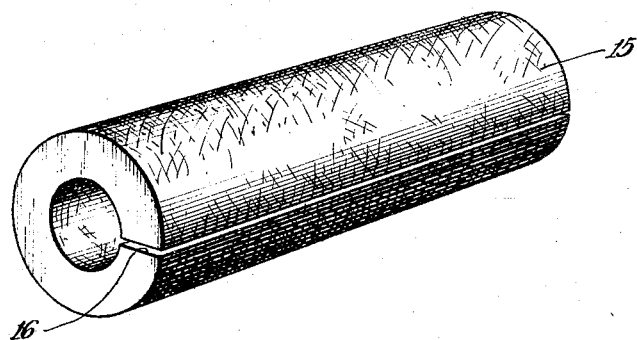
Figure 6 is a perspective view of a modified form of roll.
Figure 7:
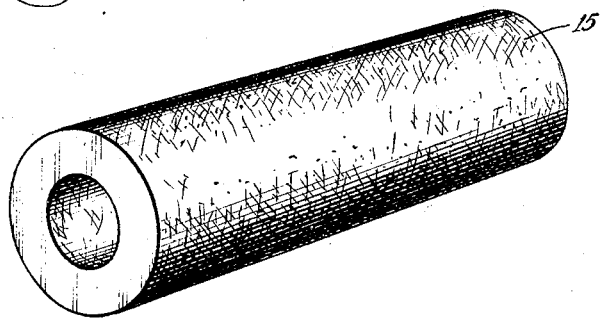
Figure 7 is a perspective view of another form of the roll.

A modified form of roll is shown in Figure 6. This form comprises a tube with a slot through one of the walls to permit the walls to be separated so that a frankfurter can be inserted in the interior of the tube. This separation can be formed in the tubular roll when it is made or the tube can be baked in the form illustrated in Figure 7 and one of the walls can be cut.

An apparatus for making this form of roll is illustrated in Figures 8 and 9. In general, it comprises a pan having a bottom 20 and a top 21 which, when assembled together, form a pan with cylindrical openings through it. A core 22 is placed in each opening. If it is desired to form the rolls with a slot in their walls, a separator 23 is provided carried, preferably, by the core 22. The assembled pan is shown in Figure 9. It has a rectangular frame 24, the ends 25 of which carry flanges or collars 26 for holding the cores 22. The bottom 20 is supported by the frame. It has a series of semi-circular valleys or troughs 27 in it. The top fits within the frame and is removable. It has a series of semi-circular ridges 28 which are complimentary to the valleys in the bottom so that when the two parts are fitted together a series of cylindrical openings are provided. The cores 22 are hollow cylinders which fit onto the collars 26 on the ends of the frame. The separators 23 extend the length of the cores and are removable from them so that they can be used or not according to the desire of the baker. One of the ends 25 is removable so that after the rolls have been baked, the end can be removed and the cores 22 pulled out.

In the use of this pan, dough is placed in the bottom and filled around the cores 22. The top is then placed in position and the dough is forced into tubular shape. The pan is put in the oven and the rolls baked. After the pan is removed, the end or ends are taken out and the cores removed. This leaves a baked roll in the form of a tube with a slot in one side.

The size and shape of the pan may be varied to suit the requirements. One or more tubes may be baked at the same time of any length desired.

The steps followed in the process are to form the dough into tubular shape, hold it in this shape and bake it while so held. The walls of the tube may be separated at the time the tube is formed or subsequently by cutting.

This roll has the advantage that it is economical in material, easy to handle, and it makes a neat, compact sandwich, but it is not as convenient or desirable as the one first described.

If the tube has a slot in it as it comes from the pan it is only necessary to spread the walls to quickly insert a frankfurter. The hollow interior receives the frankfurter without distorting the roll and the walls hold the frankfurter in place.

If the roll is simply in the form of a tube, the tube may be sliced open on one side, the walls separated and the frankfurter inserted.

It is to be understood that the form of roll and apparatus shown are for purposes of illustration only and that changes may be made within the spirit and scope of the invention as defined by the claims.

I claim:

1. The method of making tubular rolls for receiving frankfurters which comprises forming dough into a series of semi-tubular sections joined together along their side edges, forming a weakened portion between every other joined section, supporting the dough in this form, and baking the dough while so held.

2. The method of making tubular rolls for receiving frankfurters which comprises forming dough into a series of semi-tubular sections joined together along their side edges, separating the sections in pairs so as to leave two of them joined together along their side edges, baking the sections while held in said form, and folding one of the joined sections on to the other to form a tubular roll.

3. The method of making tubular rolls for receiving frankfurters which comprises forming dough into a series of semi-tubular sections joined together along their side edges, separating every other section from the adjacent section, forming a weakened portion between the joined sections, supporting the dough in this form, and baking the dough while held in said form.

In testimony whereof, I affix my signature.

FREDERICK E. BURDICK.